Patented Dec. 6, 1949

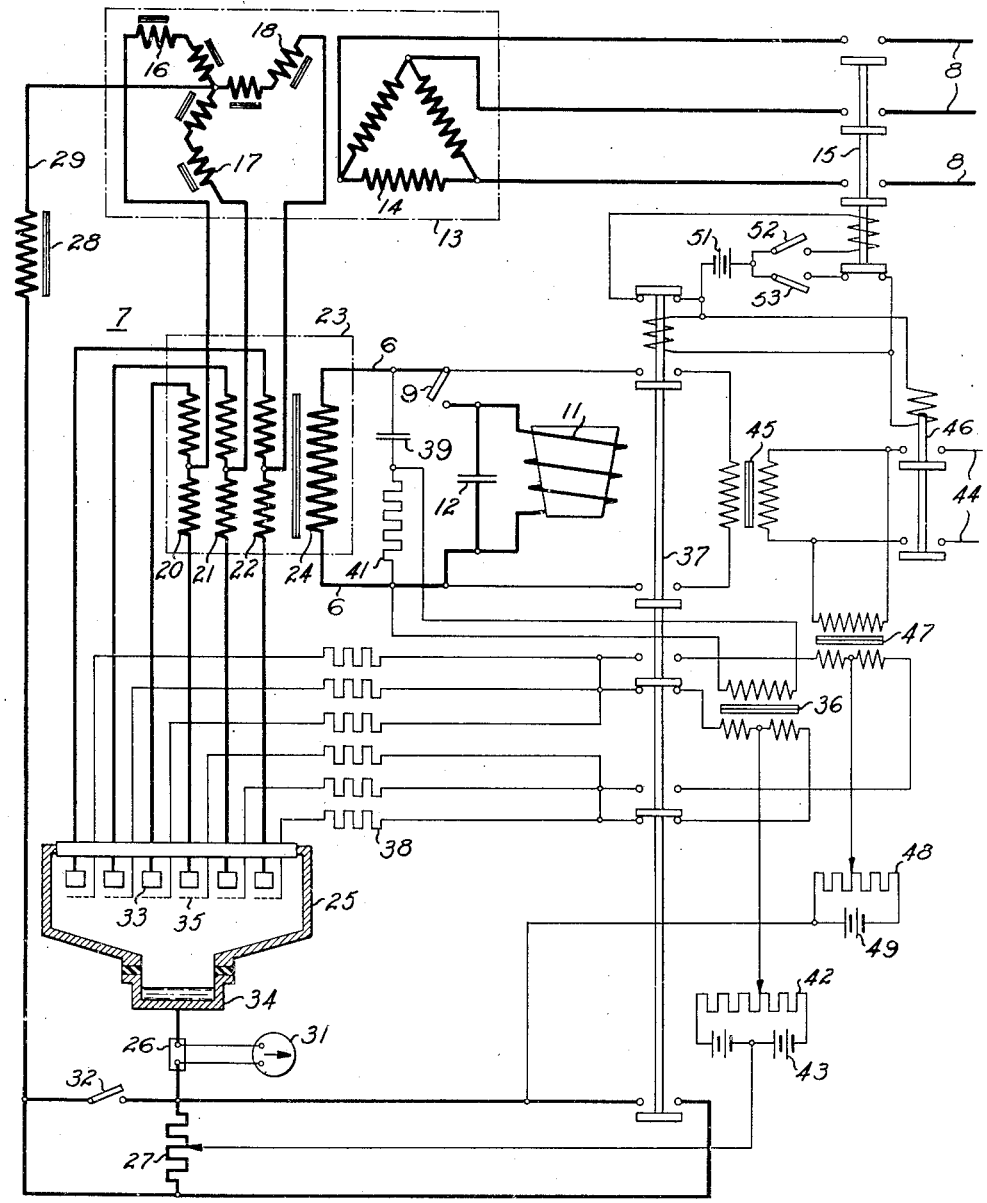

2,490,290

UNITED STATES PATENT OFFICE 2,490,290

METHOD AND MEANS FOR SUPPLYING HEATING CURRENT TO THE VALVES OF ELECTRIC CURRENT CONVERTERS

Harold Winograd, Milwaukee, Wis., assignor to Allis-Chalmers Manufacturing Company, Milwaukee, Wis., a corporation of Delaware Application November 5, 1946, Serial No. 707,969

9 Claims. (Cl. 321—66)

1

This invention relates in general to improvements in electric current converters of the electric valve type, and more particularly to methods and means for controlling the temperature of the valves of a converter when the converter is out of normal operation.

When electric current of one frequency is to be converted into current of another frequency, it is advantageous to utilize for such conversion a system comprising electric valves of the discontinuously controllable type. It is generally found, however, that to enable the system to operate without disturbance the temperature of the valves should be maintained within a predetermined range, particularly if the valves are of the liquid cathode type. The control of the valve temperature is obtained by balancing the rate of evolution of heat resulting from the flow of current through the valves against the rate of abstraction of such heat by a suitable cooling medium, such as air or water.

If the system is maintained out of operation for a substantial length of time, the temperature of the valves usually drops below the operating range. When operation is resumed, disturbances are apt to take place in the operation of the valves until the valve temperature has returned to the operating range. It is therefore advantageous to heat the valves to operating temperature prior to placing the system in operation.

Heating of the valves is preferably effected by causing current to flow through the valves from a source of such low voltage that the valves may operate without disturbance even while their temperature is still below the operating range. The low voltage for the heating operation may be obtained from low voltage taps of a supply transformer of the system, but the provision of such taps increases the complication and cost of the transformer to an objectionable extent. On the other hand, energizing the supply transformer at reduced voltage generally involves the use of bulky and expensive switching means as the transformer is generally supplied with current from a polyphase high voltage transmission circuit.

Converters such as those utilized for induction heating however are generally arranged to supply a single phase load circuit with current flowing under a relatively low voltage. A source of heating current may therefore be connected to the load circuit by means of relatively simple and inexpensive equipment taking a moderate amount of space. While the valves are being heated by

2 means of current supplied thereto at low voltage, the current may be regulated without difficulty by controlling the conductivity of the valves even when the valves are still at ambient temperature. The valves are generally disposed in parallel circuits which then carry current simultaneously. The valve currents are maintained balanced by the action of inductive elements of the converter, which are then inoperative for the conversion of such currents into current of another form.

It is therefore an object of the present invention to control the temperature of the valves of a current converter, while the latter is disconnected from its supply circuit, by energizing the load circuit of the converter from a separate source.

Another object of the present invention is to control the temperature of the valves of a current converter by supplying current to the valves through the load circuit of the converter and regulating the current by controlling the conductivity of the valves.

Another object of the present invention is to control the temperature of the valves of a current converter by causing current to flow simultaneously through converter circuits which carry current sequentially during normal operation of the converter.

Objects and advantages other than those above set forth will be apparent from a consideration of the following description when read in connection with the accompanying drawing which diagrammatically illustrates the connections of one embodiment of the present invention.

Referring more particularly to the drawing by characters of reference, single phase current of relatively high frequency is to be supplied to a load circuit 6 by means of a converter generally designated 7. The converter is supplied from a three-phase supply circuit 8 operating at a relatively low frequency. Circuit 6 is assumed to be connected through a load switch 9 with an induction heating coil 11 and a capacitor 12 of sufficient capacitance to impart to circuit 6 a capacitive character.

Converter 7 comprises an input transformer 13 provided with a polyphase set of primary windings 14, which may be connected with the different conductors of circuit 8 through a switch 15. Windings 14 are inductively related with a plurality of secondary phase windings 16, 17, 18 disposed on a plurality of core legs. The secondary windings define a neutral point and are symmetrically disposed on the associated core in any suitable known manner so as to preclude dissymmetrical magnetization of the core upon sequential flow of balanced unidirectional current impulses through the different windings.

The terminals of windings 16, 17, 18 are severally connected with the midtaps of primary windings 20, 21, 22 of an output transformer 23 having a secondary winding 24 connected with load circuit 6. The terminals of windings 20, 21, 22 are connected with the secondary neutral point of transformer 13 through a plurality of electric valves 25 of the discontinuously controllable type, a shunt 26, a resistor 27, and a reactor 28 to complete a circuit 29 for the transfer of energy between transformers 13 and 23. An ammeter 31 may be connected to shunt 26 to measure the current through circuit 29. A switch 32 may be provided to short circuit resistor 27.

Valves 25 are provided with anodes 33, which may be disposed each with an associated cathode in a separate casing, or which may all be arranged in a common casing provided with a common cathode 34. The cathode is provided with the usual means (not shown) for initiating and maintaining the emission of electrons thereat. The conductivity of the valves is controlled by suitable control electrodes 35 which may be grids when the continuously emissive type of cathode is utilized. Although but one grid is shown associated with each anode to simplify the drawing, it will be understood that grids may be provided in any number that may be required for the trouble-free operation of valves 25. The valves may also be provided with suitable cooling means (not shown) to regulate the temperature thereof during normal operation.

Grids 35 may be energized in two groups of three from a transformer 36 through auxiliary contacts of a contactor type switch 37 and through current limiting resistors 38. Transformer 36 is energized from circuit 6 through a phase shifting circuit comprising a capacitor 39 and a resistor 41. A unidirectional potential component of either polarity may be impressed on grids 35 by means of a voltage divider 42 energized from a suitable source of direct current conventionally represented as a battery 43. A further unidirectional component of a value depending on the magnitude of the flow of current through circuit 29 may be impressed on grids 35 by connecting battery 43 with a tap of resistor 27.

When converter 7 is out of operation, circuit 6 may be energized from a suitable source of alternating current such as a low voltage auxiliary circuit 44 connected with a suitable generator (not shown). The connections between circuits 6 and 44 require merely conventional low voltage equipment such as the main contacts of switch 37, a transformer 45 and the contacts of a contactor switch 46. When circuit 6 is energized from circuit 44 at a suitable voltage for heating valves 25, grids 35 are supplied with current at suitable voltage from circuit 44 through a transformer 47, contacts of switch 37 and resistors 38. A negative unidirectional potential component may be impressed on the grids from a voltage divider 48 energized from a battery 49 connected with cathode 34.

Switches 15, 37 and 46 are interlocked to prevent switch 15 from being closed simultaneously with switches 37 and 46. For the latter purpose the operating coil of switch 15 may be energized from a suitable source, such as a battery 51, through a manually actuated switch 52 and auxiliary contacts of switch 37. The operating coils of switches 37 and 46 may likewise be energized from battery 51 or other suitable source through a manually actuated switch 53 and auxiliary contacts of switch 15.

If it be assumed at first that valves 25 are at normal operating temperature, the operation of converter 7 may be initiated by rendering cathode 34 conductive and closing switch 52 to cause closure of switch 15. Switch 9 is also closed to connect coil 11 and capacitor 12 to circuit 6. A positive potential is caused to be impressed on grids 35 from battery 43 by suitable adjustment of voltage divider 42. The grids render valves 25 conductive, and a flow of rectified current takes place through circuit 29 in response to energization of transformer 13 from circuit 8. The current in circuit 29 causes impression on grids 35, in the negative sense, of the voltage drop in a portion of resistor 27, which causes the grids to interrupt the flow of current. Upon such interruption the voltage drop in resistor 27 collapses so that the current is re-established. Such action takes place periodically to render the current pulsating.

As a result of the inductive connection between the windings of transformer 23, the flow of pulsating current through windings 20, 21, 22 causes coil 11 and capacitor 12 to enter into oscillation. The resulting oscillatory voltage of circuit 6 is impressed on grids 35 through transformer 36 to establish the normal converting operation of the system. Resistor 27 may then be short circuited by means of switch 32 to reduce the losses in circuit 29, which then carries a substantially uniform direct current. Voltage divider 42 may be readjusted to cause impression of a negative potential component therefrom on the grids as is found advantageous for the trouble-free operation of the converter.

The current through circuit 29 results from the combination of unidirectional current impulses flowing sequentially through windings 16, 17, 18 during each cycle of the voltage of circuit 8, which circuit operates at a relatively low frequency such as 60 cycles per second. Each current impulse is transferred repeatedly between the two halves of one of the primary windings of transformer 23 at a frequency which may be of the order of a thousand cycles per second as a result of the impression on grids 35 of an alternating potential component of proper phase from circuit 6 through transformer 36, and of the commutating action of the current of capacitor 12.

The flow of current through valves 25 results in the production of heat therein and the valves are arranged to be cooled to such an extent that their temperature remains within the range found most conducive to trouble-free operation.

Converter 7 may be placed out of operation by opening switch 52 to cause opening of switch 15. Valves 25 may then be maintained at operating temperature by the flow of low voltage current therethrough. To supply heating current to the valves, switch 53 is closed to cause closure of switches 37 and 46. Current is then supplied to winding 24 from circuit 44 under a voltage which is a fraction of the normal operating voltage of circuit 6. The core of transformer 23 thus is not subjected to excessive magnetization even if circuit 44 operates at a frequency, such as 60 cycles per second, which is much lower than the frequency at which transformer 23 is designed to operate.

Windings 20, 21 and 22 impress on anodes 33 alternating potentials which bring the anodes, three at a time, to a potential higher than the potential of the other anodes and of cathode 34. Provided that the associated grids are then at a positive potential, the particular three anodes having the highest potential carry current simultaneously, the anode current impulses combining at cathode 34 form a flow of rectified current through circuit 29. Current then flows simultaneously at all times through windings 16, 17, 18 and the flow of such current is rendered substantially uniform by reactor 28. As a result of the particular arrangement of windings 16, 17, 18 on the associated core legs, the simultaneous flow of current through windings 16, 17, 18 produces a differential magnetizing effect on each core leg. As long as the currents of the windings remain substantially balanced, the core of transformer 13 therefore remains substantially demagnetized and no appreciable voltage is induced in any part of windings 14. The voltage drops produced in windings 16, 17, 18 by the flow of current therethrough absorb a substantial part of the voltages impressed on circuit 29 from windings 20, 21, 22 and therefore cause the currents in the different windings to be automatically maintained balanced.

The magnitude of the flow of current through circuit 29 and valves 25 may be observed by means of ammeter 31. Voltage divider 48 may be adjusted to cause anodes 33 to carry current during a predetermined portion of the voltage cycle of circuit 44 to cause the current to be regulated to the desired value. In general, the voltage impressed on circuit 6 during the heating operation is too low to effect energization of grids 35 at the desired voltage through transformer 36. The desired energization of the grids may then be obtained by substituting a suitable transformer 47 for transformer 36 through auxiliary contacts of switch 37 or by modifying the connections of transformer 36 to the necessary extent.

While circuit 44 is connected with circuit 6, switch 9 may be held open to disconnect from circuit 6 the load devices such as coil 11 and capacitor 12 normally supplied therefrom and thereby reduce the loading of transformer 45.

When converting operation is to be resumed, switch 53 is opened to cause opening of switch 37 and 46 and converter 7 may again be placed in normal operation in the manner above set forth.

Although but one embodiment of the present invention has been illustrated and described, it will be apparent to one skilled in the art that various changes and modifications may be made therein without departing from the spirit of the invention or the scope of the appended claims.

It is claimed and desired to secure by Letters Patent:

1. The method of maintaining within a predetermined range the temperature of the valves of a converter adapted for transmitting current from an alternating current supply circuit operating at one frequency to an alternating current load circuit operating at another frequency comprising the steps of disconnecting said converter from said supply circuit, connecting said load circuit with a source of alternating current, and controlling the conductivity of the converter valves to regulate the flow of current through said valves to maintain said temperature within said range.

2. In a system for controlling the temperature of electric valves, the combination of an input transformer, an output transformer, a circuit adapted for the conversion of alternating current of one frequency into alternating current of another frequency comprising a plurality of electric valves interconnecting said transformers, a first source of alternating current, first means for connecting said first source to said input transformer, a second source of alternating current, second means for connecting said second source to said output transformer for heating said valves, and interlock means connected with said first and second connecting means for preventing the connection of said first source of alternating current to said input transformer when said second source of alternating current is connected to said output transformer.

3. In a system for controlling the temperature of electric valves, the combination of an input transformer having primary and secondary winding means, a first source of power supply, an output transformer having primary and secondary winding means, a circuit for the conversion of alternating current of one frequency into alternating current of another frequency in response to connection of said source to said input transformer primary winding means, said circuit comprising a plurality of electric valves connecting said output transformer primary winding means with said input transformer secondary winding means, a second source of power supply, and means for connecting said second source to said output transformer secondary winding means when said input transformer primary winding means is disconnected from said first source to induce a flow of current through said circuit for heating said valves without inducing voltages in said input transformer primary winding means.

4. In a system for controlling the temperature of electric valves, the combination of an input transformer having polyphase primary and secondary winding means, a source of polyphase alternating current, an output transformer having single phase primary and secondary winding means, a circuit for the conversion of polyphase alternating current into single phase alternating current in response to connection of said source to said polyphase primary winding means, said circuit comprising a plurality of electric valves connecting said polyphase secondary winding means with said single phase primary winding means, a source of single phase alternating current, and means for connecting said single phase source to said single phase secondary winding means when said polyphase primary winding means is disconnected from said polyphase source to induce a flow of current in said circuit for heating said valves without inducing voltages in said polyphase primary winding means.

5. In a system for controlling the temperature of electric valves, the combination of an input transformer having a plurality of primary and secondary phase windings, a power supply circuit, an output transformer having a plurality of single phase primary windings and a secondary winding, a circuit for conducting current impulses sequentially through the different said input transformer secondary phase windings in response to energization of said input transformer primary phase windings with polyphase alternating current from said supply circuit comprising a plurality of electric valves connecting said secondary phase windings with said single phase primary windings, a source of single phase alternating current, and means for connecting said source of single phase alternating current to said output transformer secondary winding when said input transformer primary phase windings are disconnected from said supply circuit to cause the flow of current simultaneously through the different said secondary phase windings for heating said valves.

6. In a system for controlling the temperature of electric valves, the combination of an input transformer having a plurality of primary and secondary phase windings, a power supply circuit, an output transformer having a plurality of single phase primary windings and a secondary winding, a circuit for conducting current impulses sequentially through the different said input transformer secondary phase windings in response to energization of said input transformer primary phase windings with polyphase alternating current from said supply circuit comprising a plurality of electric valves connecting said secondary phase windings with said single phase primary windings, a source of single phase alternating current, means for connecting said single phase source to said output transformer secondary winding when said input transformer primary phase windings are disconnected from said supply circuit for heating said valves, and means for controlling the conductivity of said valves to cause the flow of current simultaneously through the different said input secondary phase windings.

7. In a system for controlling the temperature of electric valves, the combination of an input transformer having a plurality of primary and secondary phase windings disposed on a plurality of core legs, a power supply circuit, an output transformer having a plurality of single phase primary windings and a secondary winding, a circuit for conducting current impulses sequentially through the different said input transformer secondary phase windings in response to energization of said input transformer primary phase windings with polyphase alternating current from said supply circuit comprising a plurality of electric valves connecting said secondary phase windings with said single phase primary windings, a source of single phase alternating current, means for connecting said single phase source to said output transformer secondary winding when said input transformer primary windings are disconnected from said supply circuit for heating said valves, and means for controlling the conductivity of said valves to cause the flow of current simultaneously through the different said secondary phase windings, said simultaneous currents producing differential magnetizing effects in said core legs.

8. In a system for controlling the temperature of electric valves, the combination of an input transformer having primary and secondary winding means disposed on a plurality of core legs, a supply circuit, an output transformer having primary and secondary winding means, a circuit for the conversion of alternating current of one frequency into alternating current of another frequency in response to connection of said supply circuit to said input transformer primary winding means, said circuit comprising a plurality of electric valves connecting said input transformer secondary winding means with said output transformer primary winding means, a source of single phase alternating current, means for connecting said source of single phase alternating current to said output transformer secondary winding means when said input transformer primary winding means is disconnected from said supply circuit for supplying heating current to said valves, and means effective at the frequency of said source for controlling the conductivity of said valves to cause the flow through said valves of currents producing differential magnetizing effects in said core legs.

9. In a system for controlling the heating of electric valves, the combination of an input transformer having primary and secondary winding means, a first source of power supply, an output transformer having primary and secondary winding means, a circuit for the conversion of alternating current of one frequency into alternating current of another frequency in response to connection of said source to said input transformer primary winding means, said circuit comprising a plurality of electric valves connecting said output transformer primary winding means with said input transformer secondary winding means, a second source of power supply, means for connecting said second source to said output transformer secondary winding means when said input transformer primary winding means is disconnected from said first source for supplying heating current to said circuit, and means for further connecting said second source to said valves for controlling the conductivity thereof to cause a predetermined flow of heating current therethrough.

HAROLD WINOGRAD.

REFERENCES CITED

The following references are of record in the file of this patent:

UNITED STATES PATENTS

| Number | Name | Date |
| --- | --- | --- |
| 2,119,130 | Ehrensperger | May 31, 1938 |
| 2,300,377 | Dortort | Oct. 27, 1942 |